United States Patent [19]

Fukushima et al.

[11] Patent Number: 5,113,298
[45] Date of Patent: May 12, 1992

[54] ROTARY HEAD DRUM APPARATUS WITH RESILIENTLY MOUNTED GROUND PLATE

[75] Inventors: Hideo Fukushima, Tokyo; Masakazu Kurushima, Kanagawa, both of Japan

[73] Assignee: Sony Corporation, Tokyo, Japan

[21] Appl. No.: 612,415

[22] Filed: Nov. 13, 1990

Related U.S. Application Data

[62] Division of Ser. No. 371,293, Jun. 26, 1989, Pat. No. 5,010,432.

[30] Foreign Application Priority Data

Jun. 28, 1988 [JP] Japan .................. 63-59942
Jun. 28, 1988 [JP] Japan .................. 63-59943
Jun. 28, 1988 [JP] Japan .................. 59944

[51] Int. Cl.$^5$ .................. G11B 5/52; G11B 15/60
[52] U.S. Cl. .................. 360/108; 360/84; 360/130.22; 360/130.24
[58] Field of Search .......... 360/130.22, 130.24, 360/130.3, 84, 107, 108, 137

[56] References Cited

U.S. PATENT DOCUMENTS

| | | | |
|---|---|---|---|
| 4,740,848 | 4/1988 | Schild et al. ........... | 360/84 X |
| 4,835,645 | 5/1989 | Ohji et al. ........... | 360/108 X |
| 5,010,432 | 4/1991 | Fukushima et al. ......... | 360/130.22 |

FOREIGN PATENT DOCUMENTS

| | | | |
|---|---|---|---|
| 58-19729 | 2/1983 | Japan ............... | 360/130.22 |
| 1302501 | 12/1989 | Japan ............... | 360/130.24 |
| 0029042 | 1/1990 | Japan ............... | 360/130.24 |
| 2149955 | 6/1985 | United Kingdom . | |

Primary Examiner—Aristotelis Psitos
Assistant Examiner—Alfonso Garcia
Attorney, Agent, or Firm—Alvin Sinderbrand; William S. Frommer

[57] ABSTRACT

In a rotary head drum apparatus having a magnetic head attached to a rotary drum member and connected to a coil of a rotor of a rotary transformer so that a signal is transmitted between the magnetic head and a stationary drum member through the rotary transformer, a resilient contactor is mounted on one of the rotary drum member and the rotor of the rotary transformer, and a contact portion is formed on the other of the rotor and the rotary drum member so as to be contacted by the resilient contactor when the rotary drum and the rotary transformer are assembled with each other. The apparatus further includes an aperture bored through an end face of the stationary drum member and a ground contact pin which is flexible in its radial direction is inserted into the aperture for connecting the stationary drum member to ground. Further, the rotary or stationary drum member is rotatably supported through a support shaft secured in a bore of the stationary or rotary drum member, respectively, and at least one concave or undercut annulus is formed in the inner surface of the bore into which the support shaft is the inserted with a press-fit so as to be secured to the inner surface of the bore at its lands or portions above and below the concave or undercut annulus.

4 Claims, 6 Drawing Sheets

ROTARY HEAD DRUM APPARATUS WITH RESILIENTLY MOUNTED GROUND PLATE

This application is a division of application Ser. No. 07/371,293, filed Jun. 26, 1989 now U.S. Pat. No. 5,010,432.

BACKGROUND OF THE INVENTION

1. Field of the Invention

The present invention relates generally to a rotary head drum apparatus having rotary and stationary drum members, and more particularly is directed to an arrangement through which signals are transmitted between the stationary drum member and each magnetic head attached to the rotary drum member in a magnetic recording and reproducing apparatus such as a video tape recorder and the like.

2. Description of the Prior Art

A video tape recorder (VTR) generally includes a rotary head drum assembly or apparatus which comprises a rotary drum member having at least one magnetic head attached thereto and a stationary drum member located just below the rotary drum member, with a magnetic tape being helically wrapped around the rotary and stationary drum members. When the rotary drum member is rotated, the magnetic head mounted thereon scans the magnetic tape, thereby effecting the so-called helical scanning. The magnetic head is connected to a rotor of a rotary transformer which transmits signals between the rotary and stationary drum members of the drum assembly.

In a video tape recorder as described above, the magnetic head and the rotor of the rotary transformer have to be electrically connected to each other. For effecting such electrical connection, there has been provided a joint base plate to which there are soldered a lead wire extending from the magnetic or video head and a lead wire extending from a rotor of the rotary transformer. When the magnetic head and the rotor of the rotary transformer are electrically connected by means of the joint base plate, as aforesaid, if the diameter of the rotary drum member is reduced for decreasing the overall size of the VTR, it becomes very difficult to solder the lead wires to the joint base plate in the course of assembling together the various elements of the head drum assembly or apparatus. Further, in the course of the soldering-process, solder flux and solder balls are produced which frequently enter the inside of the head drum.

In order to electrically connect the magnetic head and the rotor of the rotary transformer to each other without employing the joint base plate, it has been proposed to use a connector comprised of a plug pin and a plug socket which, when the head drum apparatus is assembled are electrically connected to each other. However, a relatively large force is required to insert the plug pin into the plug socket so that a load is applied to a bearing or the like. A rotary head drum apparatus of this kind is undesirably influenced by such a large insertion force which causes the magnetic head, initially mounted on the rotary drum with high accuracy, to be displaced from its desired position.

Further, in a rotary head drum apparatus of a video tape recorder as described above, the rotary head drum member has to be connected to ground through a cable extending between the head drum and a head amplifier. To ground the head drum, a joint base plate is attached to the lower surface of the stationary drum, for example, by a screw, and a ground contact is connected to the joint base plate. However, when the joint base plate is attached to the lower surface of the stationary drum by a screw for grounding the head drum, the head drum may be deformed thereby so that the tracking accuracy is deteriorated, and the resulting picture is disturbed accordingly.

Further, in a known rotary head drum apparatus, a support shaft has a press fit in a bore of the lower stationary drum member and the upper rotary drum member is rotatably supported by the support shaft via a bearing. In assembling this kind of rotary head drum apparatus, in order to fit the support shaft in the stationary drum member, with high accuracy in the vertical direction, a so-called shrink-fit process is employed. According to such shrink-fit process, the stationary drum member is heated to 150° C. or more so that its bore is diametrically expanded and, while the stationary drum member is in this heated condition, the support shaft is easily fitted into the bore of the stationary drum. Of course, when the stationary drum member cools down to ambient temperature, the bore contracts on the support shaft and seizes the latter. The shrink-fit process has the following advantages. If the support shaft is press-fitted into the bore of the stationary drum member at room temperature, then the support shaft will dig into the inner surface of the bore of the stationary drum member. As a result, the support shaft cannot be precisely axially located in the bore of the stationary drum member. On the other hand, when the stationary drum member is heated so as to temporarily increase the inner diameter of the bore, the support shaft can be fitted into the bore with a small inserting force. Hence, the inner surface of the bore of the stationary drum member can be protected from being scored or cut, and the support shaft can be fitted into the bore with a high degree of accuracy in the axial or vertical direction.

The shrink-fit process, however, cannot avoid the following defects. If the stationary drum is heated in order to fit the support shaft into the bore thereof, as in the shrink-fit process, then the coil of the rotary transformer attached to the stationary drum member may be burned. Further, the shrink-fit process decreases the bonding force of the bonding agent which secures the rotary transformer to the stationary drum member. There is then a possibility that the rotary transformer will be detached from the stationary drum member. Therefore, the shrink-fit process cannot be applied to a rotary head drum apparatus of the type in which the rotary transformer is secured to the stationary drum member by an adhesive or bonding agent.

OBJECTS AND SUMMARY OF THE INVENTION

Accordingly, it is an object of the present invention to provide an improved rotary head drum apparatus which can avoid the above-mentioned disadvantages or problems associated with the prior art.

More specifically, it is an object of the present invention to provide a rotary head drum apparatus in which a magnetic head mounted on a rotary drum member and a rotor of a rotary transformer are easily and reliably connected electrically with each other even in a small or limited space.

It is another object of the present invention to provide a rotary head drum apparatus in which a magnetic head can be mounted with precision on a rotary drum member.

It is still another object of the present invention to provide a rotary head drum apparatus in which a stationary drum member can be positively connected to ground without being warped or distorted, as when a joint base plate having a ground contact pin is attached to the lower surface of the stationary drum member by screws or the like.

It is still another object of the present invention to provide a rotary head drum apparatus in which a support shaft can be fitted into a bore of a stationary drum member at room temperature so that a rotary transformer having its stator attached to the stationary drum member will not be affected thereby.

It is a further object of the present invention to provide a rotary head drum apparatus in which a support shaft can be fitted into a bore of a stationary drum member with high accuracy in the vertical direction.

It is yet a further object of the present invention to provide a rotary head drum apparatus, as aforesaid, which is particularly suited for incorporation in a magnetic recording and reproducing apparatus, such as a video tape recorder and the like.

In accordance with an aspect of the present invention, in a rotary head drum apparatus in which a magnetic head is attached to a rotary drum member and is electrically connected to a coil of a rotor of a rotary transformer so that a signal is transmitted between the magnetic head and a stationary drum member through the rotary transformer; there are provided:

a resilient contactor mounted on one of the rotary drum member and the rotor of the rotary transformer; and a contact portion formed on the other of the rotary drum member and the rotor so as to be resiliently contacted by the contactor in response to assembling together of the rotary drum member and the rotary transformer.

In accordance with another aspect of the present invention, in a rotary head drum apparatus having a rotary drum member on which a magnetic head is mounted and a stationary drum member for rotatably supporting the rotary drum member through a support shaft, and in which outer peripheral surfaces of the rotary and stationary drum members form a guide surface for a recording tape, there are provided:

an aperture bored through an end face of the stationary drum member; and a ground contact pin which is flexible in its radial direction and inserted into the aperture for connecting the stationary drum member to ground.

In accordance with a further aspect of the present invention, in a rotary head drum apparatus in which one of a rotary drum member and a stationary drum member is rotatably supported by a support shaft secured to the other of the rotary and stationary drum members, there are provided:

at least one concave or undercut annulus in the inner surface of a bore formed through the stationary or rotary drum member and into which the support shaft is inserted with a press-fit so as to be secured to the inner surface of the bore at seating portions or lands separated by the concave or undercut annulus.

The above, and other objects, features and advantages of the present invention, will be apparent in the following detailed description of a preferred embodiment of the invention when read in conjunction with the accompanying drawings, wherein the same reference numerals identify corresponding parts in the several views.

BRIEF DESCRIPTION OF THE DRAWINGS

FIG. 2B' is an enlarged detail elevational view of a contactor provided for each magnetic head on a terminal plate shown in FIG. 2B;

DETAILED DESCRIPTION OF A PREFERRED EMBODIMENT

Figure 1:
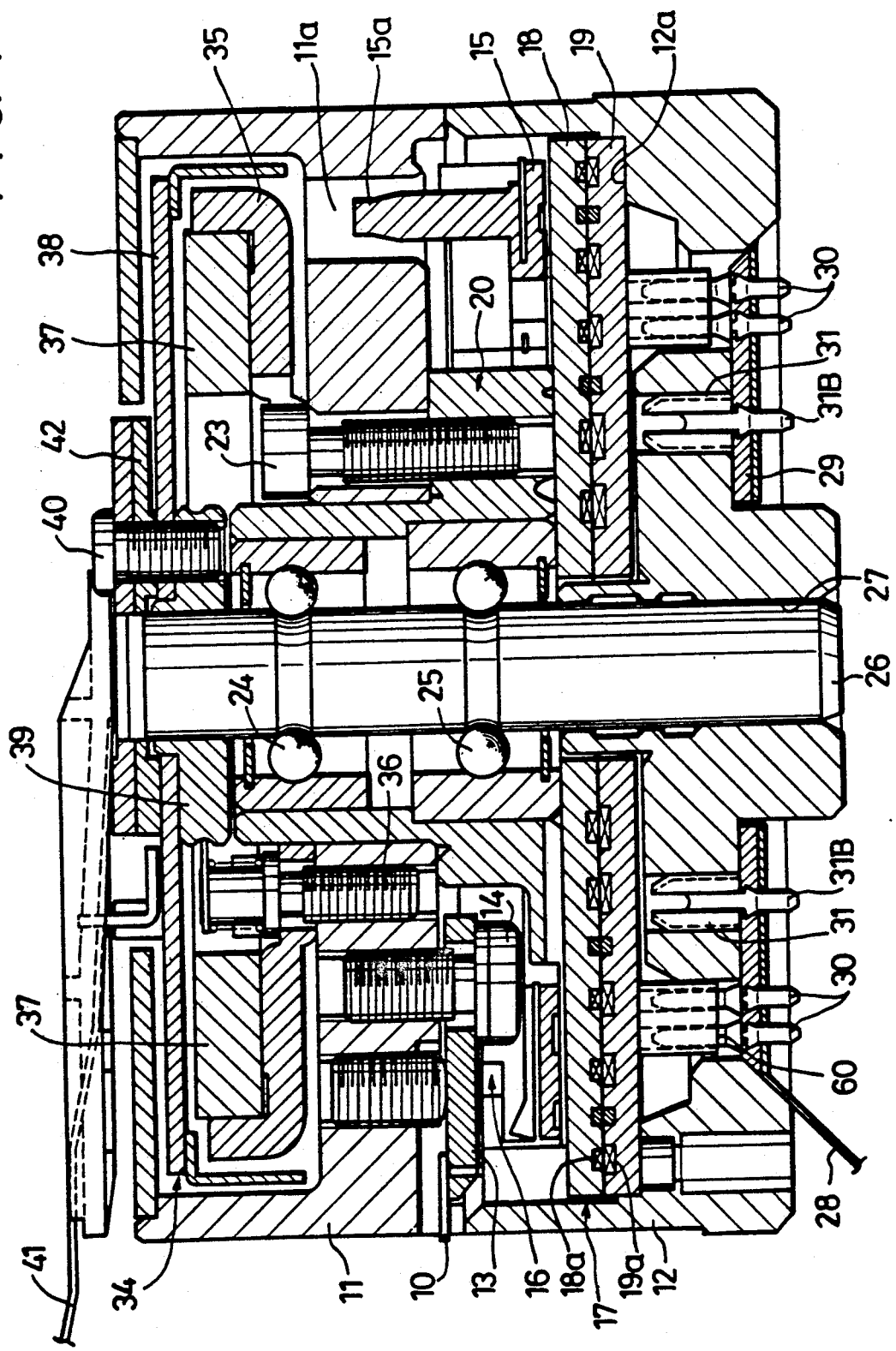
FIG. 1 is an axial sectional view of a rotary head drum apparatus according to an embodiment of the present invention and which is shown in its assembled state.

Referring to the drawings in detail and initially to FIG. 1 which shows an overall arrangement of an embodiment of a rotary head drum apparatus according to the present invention, it will be seen that such rotary head drum apparatus generally comprises a rotary drum member 11 having at least one magnetic head 10 mounted thereon, and a stationary drum member 12 that is disposed coaxially below the rotary drum member 11. Each magnetic head 10 is mounted at the radially outer end of a respective head base 13 which is secured to the lower surface of the rotary drum member 11 by a screw 14. A contactor 16 is attached to a terminal plate 15 for each magnetic head 10 for electrically connecting the respective magnetic head 10 with a rotor 18 of a rotary transformer 17. The rotary transformer 17 is used to transmit signals between the rotary drum member 11 and the stationary drum member 12. The rotor 18 of the rotary transformer 17 is attached to the rotary drum member 11 for rotation with the latter, while its stator 19 is attached to the stationary drum member 12. The rotor 18 and the stator 19 are axially opposed to each other with a very small air gap therebetween.

Figure 2A:
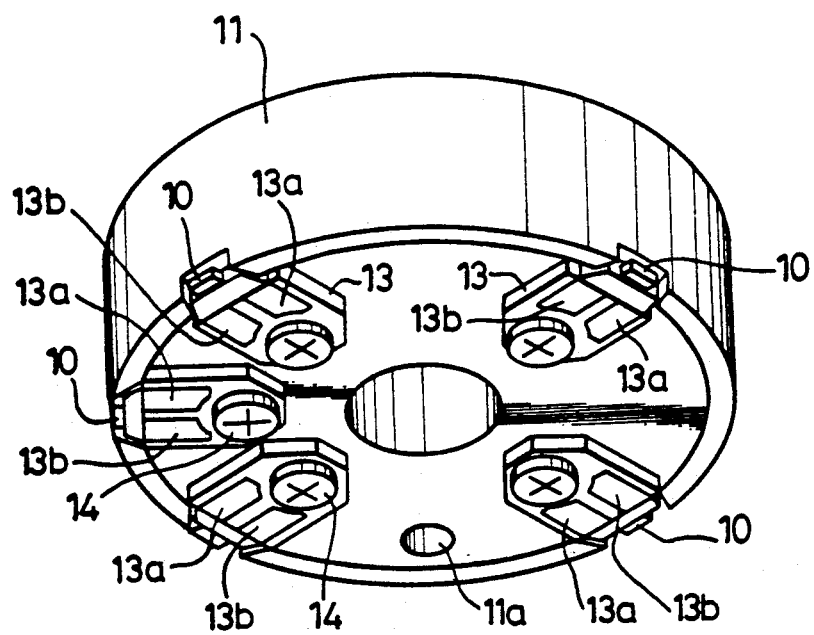
FIGS. 2A, 2B and 2C are parts of a schematic, exploded perspective view of a portion of the apparatus of FIG. 1 for illustrating the manner in which electrical connections are established between magnetic heads and a rotary transformer in such apparatus.
Figure 4:
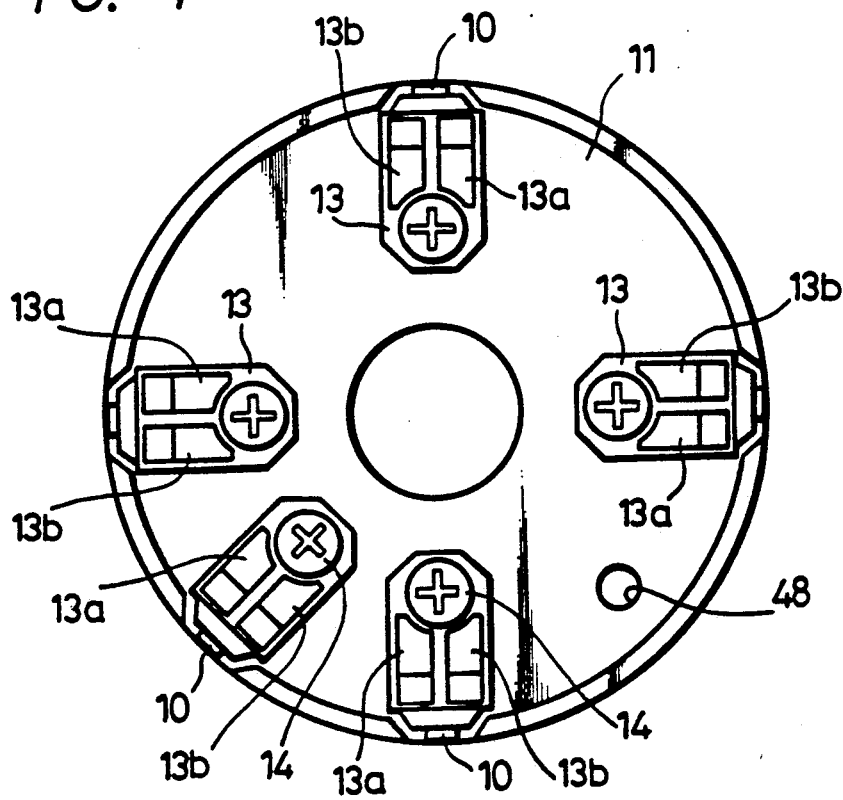
FIG. 4 is a bottom plan view of a rotary drum member shown in FIG. 2A.

The electrical connection between each magnetic head 10 mounted on the rotary drum member 11 and the rotor 18 of the rotary transformer 17 will now be further described in detail with reference to FIGS. 2A, 2B, 2B', 2C and 3. As shown on FIGS. 2B and 2B', the contactor 16 provided on the terminal plate 15 for each magnetic head 10 is formed of two leaf springs 16a and 16b each having an L-shaped configuration. When contact surfaces of the springs 16a and 16b come in contact with respective contact portions 13a and 13b formed on the under surface of the head base 13 having the respective magnetic head 10 mounted on its tip end (FIGS. 2A and 4), a signal is transmitted between the magnetic head 10 and the rotor 18 of the rotary transformer 17. Preferably, the contact surfaces of springs 16a and 16b and the contact portions 13a and 13b on the respective head base are plated with gold for increasing the conductivity therebetween.

As will be hereinafter described in detail, when the rotary drum member 11 carrying at least one magnetic head 10 is mounted on a boss 20, the head 10 may be simultaneously electrically connected to the rotor 18 of the rotary transformer 17. For this purpose, the terminal plate 15 is adhesively bonded or otherwise attached to the upper surface of the rotor 18 of the rotary transformer 17, and lead wires (not shown) extend from coils 18a (FIG. 1) of the rotor 18 and are soldered to terminals 21a and 21b formed on the terminal plate 15 between each pair of the contactor springs 16a and 16b and being electrically connected thereto.

Figure 2B:
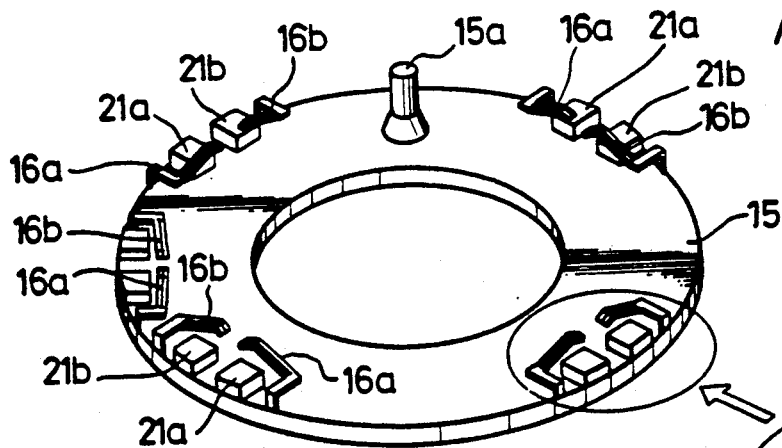
Figure 2B:
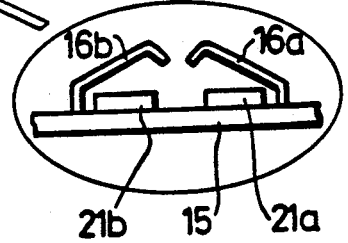
Figure 2C:
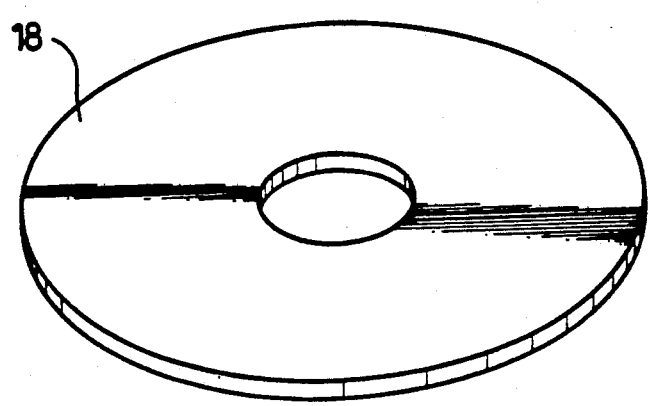
Figure 3:
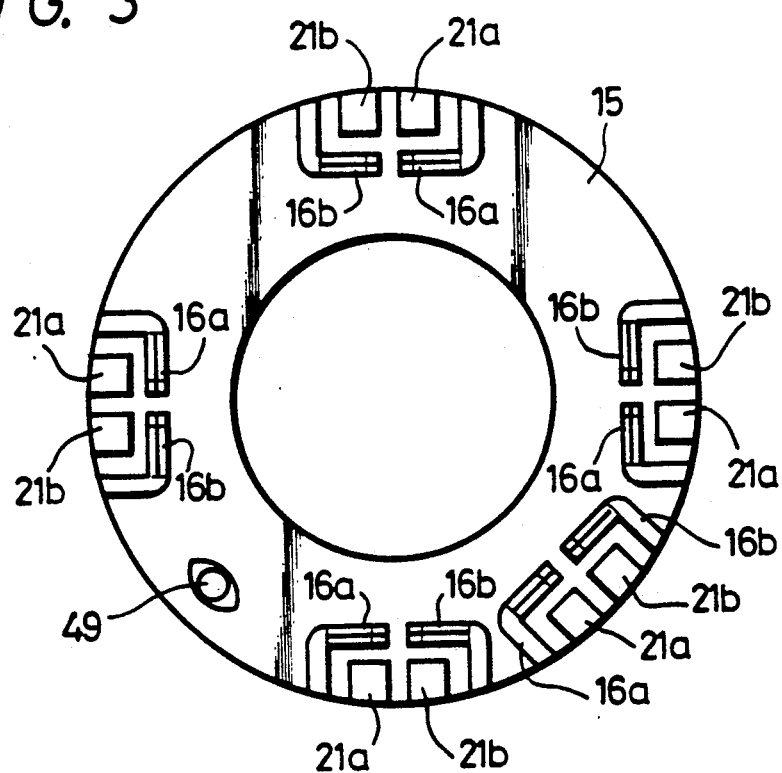
FIG. 3 is a top plan view of the terminal plate shown in FIG. 2B.

As shown on FIGS. 1 and 2B, the terminal plate 15 has an upwardly directed positioning pin 15a extending therefrom and being engageable in a positioning aperture 11a (FIG. 2A) provided in the rotary drum member 11 for circumferentially positioning the terminal plate 15 in respect to the rotary drum member 11. Such circumferential positioning of the terminal plate 15 relative to the rotary drum member 11 ensures that, upon assembly of the rotary head drum apparatus, the pairs of contactor springs 16a and 16b which are angularly spaced apart around the terminal plate 15, as shown on FIG. 2B will be angularly aligned with the respective angularly spaced apart heads 10 on the rotary head member 11, and thus will be engageable with the associated contact portions 13a and 13b on the head bases 13.

As shown on FIG. 1, the rotary drum member 11 with the magnetic heads 10 mounted thereon is assembled on the boss 20 and secured to the latter by means of a screw 23. The boss 20 is rotatably mounted by means of ball bearings 24 and 25 on the upper portion of a supporting shaft 26. The lower end portion of the supporting shaft 26 is axially press-fitted into a bore 27 extending axially through the center of the stationary drum member 12. A flexible printed circuit board 28 has a terminal plate 29 mounted on an end portion thereof for attachment to the underside of the stationary drum member 12, as shown on FIG. 1. Signal transmitting pins 30 and ground contact pins 31 for grounding the stationary drum member 12 are implanted in the terminal plate 29 and will be hereinafter further described in detail.

A motor 34 (FIG. 1) is located within the rotary drum member 11 for effecting rotation of the latter about the supporting shaft 26 relative to the stationary drum member 12. More specifically, the motor 34 is shown to include a stator yoke 35 which is secured to the rotary drum member 11 by a screw 36 and a magnet 37 adhesively bonded o otherwise secured to the stator yoke 35. A printed circuit board 38 located above the magnet 37 is fixed by a screw 40 to a boss 39 which is fixedly located on the upper end portion of the supporting shaft 26. The printed circuit board 38 includes a coil (not shown) which is in operative opposing relation to the magnet 37. A terminal plate 42 attached to an end portion of a flexible base plate 41 is also secured to the boss 39 by means of the screw 40, and the previously mentioned coil formed on the printed circuit board 38 receives the driving current for the motor 34 by way of suitable leads on the flexible base plate 41.

It will be understood that, when the rotary drum member 11 secured to the boss 20 rotatably mounted on the supporting shaft 26 is assembled axially in respect to the stationary drum member 12 with the rotary transformer 17 therebetween, the contactor springs 16a and 16b provided on the terminal plate 15 attached to the upper surface of the rotor 18 come into resilient contact with the respective contact portions 13a and 13b on each head base 13 and are made to flex for providing reliable electrical connections between the magnetic heads 10 and the respective coils of the rotor 18. Therefore, the steps required in assembling the rotary head drum apparatus embodying this invention are substantially simplified in that the electrical connections between the magnetic heads 10 and the rotor 18 of the rotary transformer 17 are made simultaneously with the axial assembling together of the rotary and stationary drum members 11 and 12. Furthermore, the electrical connections between the magnetic heads 10 and the rotor 18 of the transformer 17 can be provided in a very small or contained space.

Moreover, since the electrical connections between the magnetic heads 10 and the rotor 18 of the rotary transformer 17 are not provided by a soldering process that has to be conducted near to the rotary head drum apparatus, there is no danger that flux or solder balls will undesirably enter the rotary head drum apparatus. Moreover, since the springs 16a and 16b of the contactors 16 are flexed to engage the respective contact portions 13a and 13b on the head bases with relatively light resilient contacting forces, the magnetic heads 10 can be reliably and accurately mounted on the respective head bases 13 without the danger that such head bases will be warped or distorted by excessive forces applied thereto in achieving the necessary contacts.

Although the contact portions 13a and 13b are formed on the bases 13 supporting the magnetic heads 10 and the respective resilient contactors 16 are provided on the terminal plate 15 positioned above the rotor 18 of the rotary transformer 17 in the illustrated embodiment of the invention, it will be apparent that the positions of the contact portions 13a and 13b and the resilient contactors 16 may be reversed. In other words, the resilient contactors 16 can depend from the undersides of the head bases 13 for resiliently engaging the contact portions 13a and 13b which, in that case, are provided on the terminal plate 15.

Figure 5:
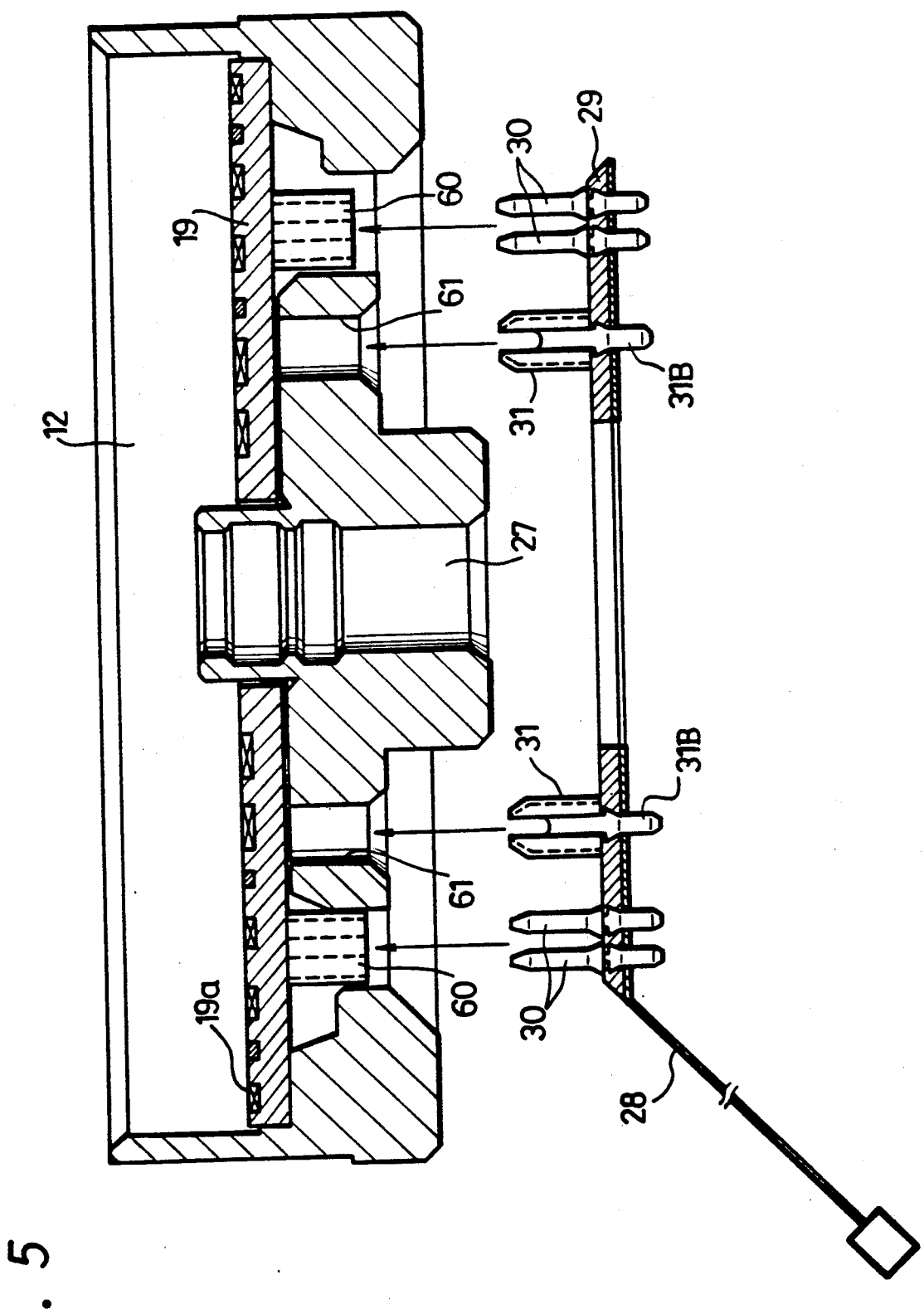
FIG. 5 is an exploded axial sectional view of a stationary drum member and printed circuit board included in the head drum apparatus of FIG. 1.
Figure 6:
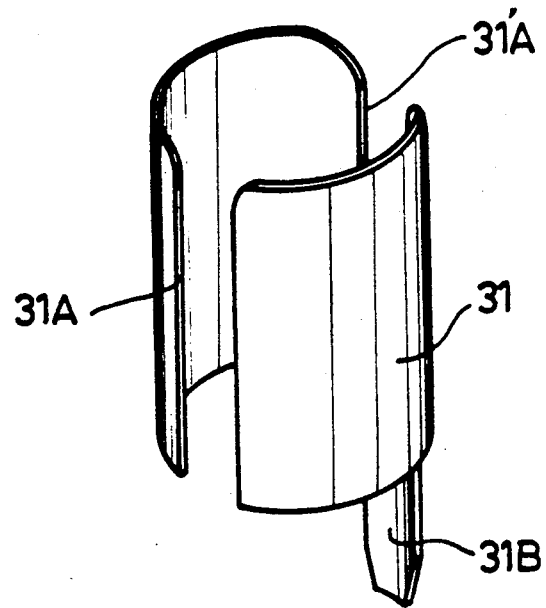
FIG. 6 is an enlarged perspective view of a ground contact pin used in the rotary head drum apparatus shown in FIG. 5.
Figure 7:
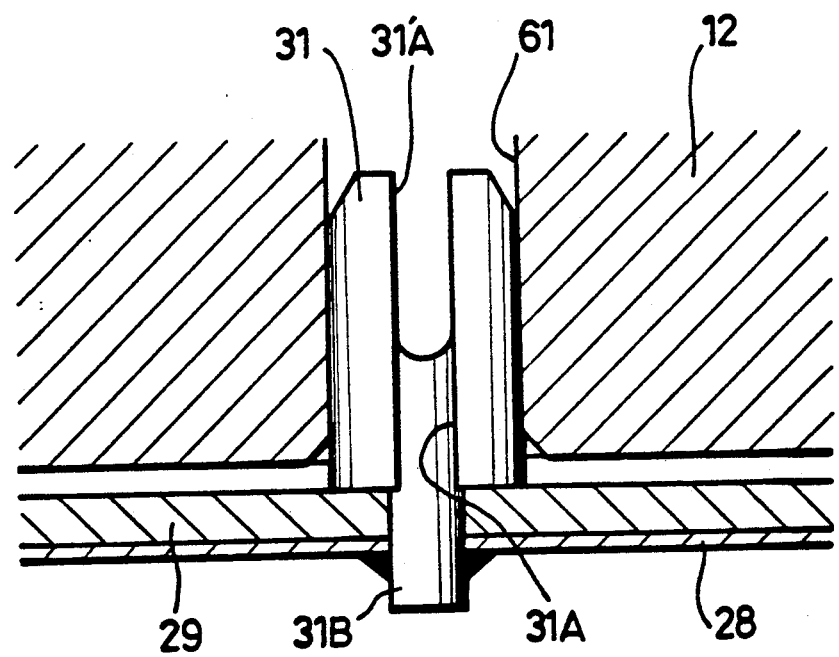
FIG. 7 is a diagrammatic, fragmentary sectional view showing how the ground contact pin of FIG. 6 is fitted into an aperture of the stationary drum member.

Referring now to FIGS. 5, 6 and 7, it will be seen that each ground contact pin 31 is formed of a conductive metal sheet material and preferably includes a generally cylindrical body having diametrically opposed longitudinally directed slits 31A and 31'A. The slit 31A, as shown on FIGS. 6 and 7, extends along the entire length of the cylindrical body while the opposing slit 31'A extends only along the upper portion of the cylindrical body which is radial resilient by reason of the slits 31A and 31'A. Further, a lead portion 31B is directed downwardly from the lower end of the cylindrical body of the pin 31, preferably at the side of the latter having the partial slit 31'A. The lead portion 31B extends downwardly through the terminal plate 29 and the flexible printed circuit board 28, as shown on FIGS. 5 and 7, and is soldered to a respective portion of the printed circuit on the board 28. The signal transmitting pins 30 directed upwardly from the terminal plate 29 and being similarly connected, as by solder, to the printed circuit on the board 28, are engaged in respective connectors 60 extending from the underside of the stator 19 in response to the positioning of the terminal plate 29 against the bottom surface of the stationary drum member 12. Simultaneously with the foregoing, the longitudinally slit cylindrical bodies of the ground contact pins 31 are fitted axially into corresponding apertures 61 formed in the stationary drum member 12. Thus, the stationary drum member 12 is connected to ground by way of the pins 31 suitably electrically connected with the printed circuit on the board 28. The cylindrical bodies of the pins 31 are desirably normally dimensioned so that the axial insertion thereof into the apertures 61 is accompanied by radial contraction of the contact pins 31. Thus, the ground contact pins 31 are pressed against the surfaces of the respective apertures 61 by their resilient restoring forces for ensuring reliable electrical contact of the pins 31 with the stationary drum member 12 which is desirably formed of aluminum.

Since the soldering process for connecting the pins 30 and 31 to the respective portions of the printed circuit on the board 28 is effected remote from the stationary drum member 12, establishing electrical connections by way of the pins 30 with respective coils 19a of the stator 19 of the rotary transformer 17, and the connection of the stationary drum member 12 to ground by way of the pins 31 can be effected without the danger of solder flux entering the stationary drum member.

Furthermore, since the apertures 61 are formed in an end face of the stationary drum member 12 for receiving the ground contact pins 31 which are resilient or flexible in the radial direction, the stationary drum member can be conveniently and reliably connected to ground merely by the axial insertion of the pins 31 in the respective apertures 61, and without the need to employ screws for maintaining the engagement of the pins 31 in the apertures 61. By reason of the absence of such screws, the tracking accuracy of the magnetic head or heads can be ensured for avoiding disturbance of a video image to be reproduced by a VTR having the rotary head drum apparatus embodying this invention.

Figure 8:
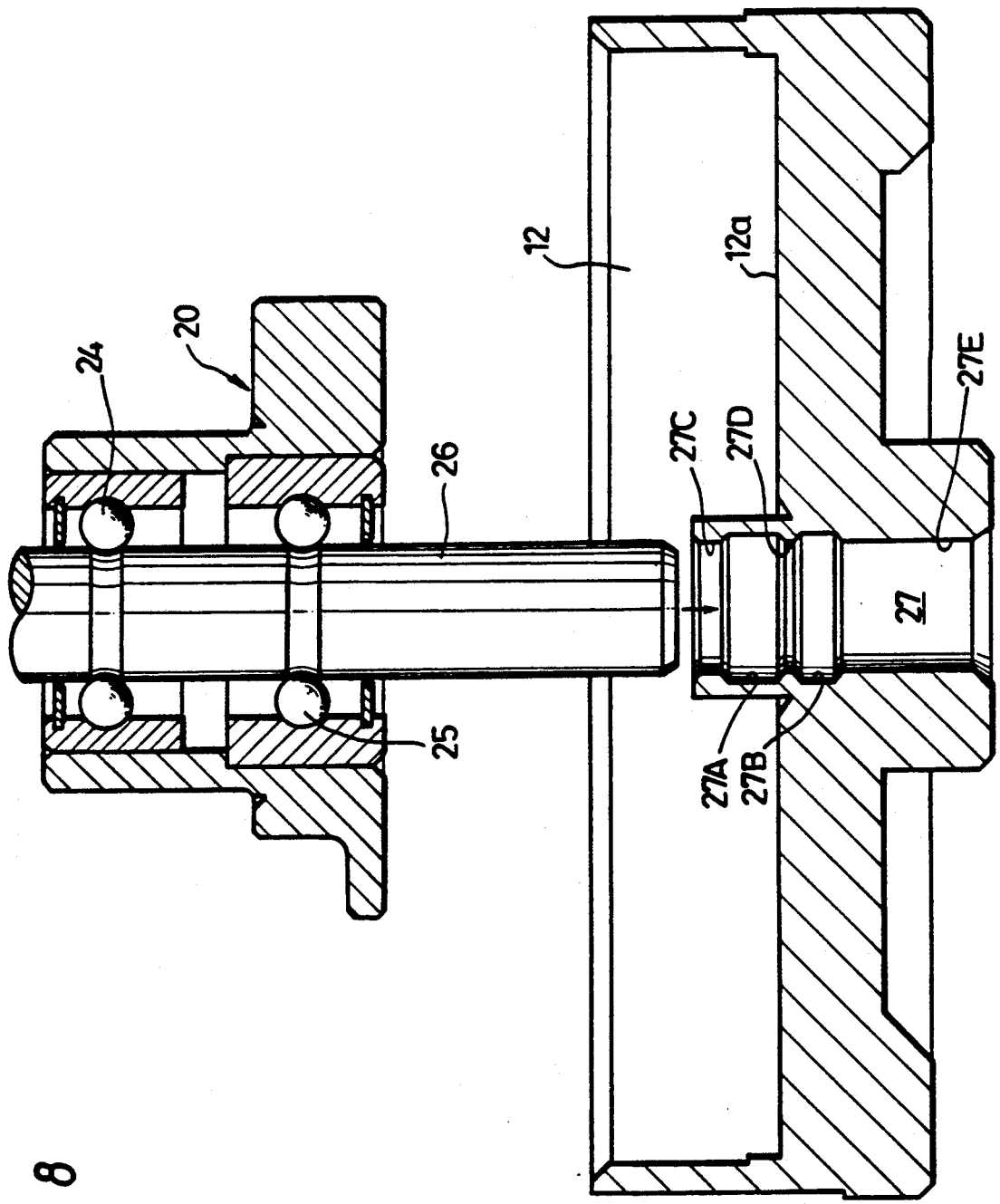
FIG. 8 is an exploded axial sectional view illustrating the manner in which a support shaft is fitted into the stationary drum member in the rotary head drum apparatus according to the present invention.

Referring now to FIG. 8, it will be seen that, in the illustrated rotary head drum apparatus embodying this invention, the bore 27 extending axially through the center of the stationary drum member 12 is formed with two vertically spaced apart concave or undercut annuli 27A and 27B so as to define annular seating portions or lands 27C, 27D and 27E which are located axially above the concave annulus 27A, intermediate the concave annuli 27A and 27B, and below the concave annulus 27B, respectively. By reason of the concave annuli 27A and 27B at which the surface of the bore 27 is relieved, the supporting shaft 26, when being pressed axially downward into the bore 27, engages the surface of the bore only at the seating or land portions 27C, 27D and 27E in succession. Thus, although the shaft 26 has a press fit within the bore 27 for suitably securing the shaft 26 relative to the stationary drum member 12, seizing or scoring of the shaft 26 or of the surface of the bore 27 is avoided during insertion of the shaft 26 into the bore 27. More specifically, as the supporting shaft 26 is urged axially downward into the bore 27, the shaft 26 initially only engages the surface of the land 27C. As the downward movement of the shaft 26 continues, the surface of the shaft comes into engagement with the land 27 while still engaging the uppermost land 27C. The axial dimensions of the first and second lands 27C and 27D are desirably in the range from about 0.1 to 0.3 mm, and the axial force that has to be applied to the shaft 26 for moving the latter downwardly past the lands 27C and 27D is preferably less than 10 kg. Such insertion of the shaft 26 to the extent required for engagement with the land 27D as well as with the land 27C is referred to as a preliminary fitting operation and ensures that, as the lower end of the shaft 26 nears the lowermost seating portion or land 27E, the shaft 26 will be precisely in axial alignment with the bore 27 and not canted in respect to the latter.

When the lower end of the shaft 26 reaches the upper edge of the seating portion or land 27E which has a relatively large axial dimension, further downward movement of the shaft 26 requires a gradual increase of the axial force applied to the shaft 26, for example, from 10 kg to about 100 kg. The maximum value of the axial force applied to the shaft 26 during such main fitting or inserting operation depends upon the axial dimension of the land 27E. In any case, after the shaft 26 has been axially inserted so as to fully engage the land 27E, for example, as in FIG. 1, the relatively large area of contact of such land 27E with the surface of the supporting shaft 26 serves to ensure the secure mounting of the shaft in the stationary drum member 12. Further, since the preliminary fitting operation during which the surface of the supporting shaft 26 engages only the relatively small areas of the lands 27C and 27D of relatively small area is effected with a relatively small axial force being applied to the shaft 26, the accurate axial alignment of the shaft 26 with the bore 27 can be reliably maintained. Thereafter, during the main fitting operation in which a large axial force has is applied to the shaft 26, the fact that the shaft 26 is not inclined or canted relative to the bore 27 ensures that the main fitting operation can be smoothly and accurately carried out. For example, the desired vertical position of the shaft 26, and hence of the heads 10 carried by the drum member 12 supported by the shaft, can be achieved within a tolerance of only 2 $\mu$m. As distinguished from the foregoing, in the prior art in which the bore of the stationary drum member has a continuous surface so that the described preliminary fitting operation does not occur, the supporting shaft may be inclined or canted relative to the axis of the bore into which it is being press-fitted and high accuracy in the vertical positioning of the shaft cannot be realized.

It will be appreciated that, in the operation of the described rotary head drum apparatus embodying this invention, magnetic tape is suitably guided so as to be wrapped around the outer peripheral surfaces of the rotary drum member 11 and the stationary drum member 12 which are coaxial with each other. When the rotary drum member 11 is rotated by the motor 34, the magnetic heads 10 extending from the bases 13 mounted on the rotary drum member 11 scan tracks extending obliquely across the magnetic tape for effecting helical scanning of the latter. In the recording mode, signals are supplied from stationary recording circuits through the rotary transformer 17 to the magnetic heads 10 and are thereby recorded in the scanned tracks on the magnetic tape. Alternatively, in the reproducing mode, signals recorded in the oblique tracks on the magnetic tape are read out therefrom by the magnetic heads scanning such tracks and the reproduced signals are supplied through the rotary transformer 17 to stationary reproducing circuits.

Having described a preferred embodiment of the invention with reference to the accompanying drawings, it is to be understood that the invention is not limited to that precise embodiment, and that various changes and modifications can be effected therein by one skilled in the art without departing from the spirit or scope of the invention as defined in the appended claims.

What is claimed is:

1. A rotary head drum apparatus comprising a rotary drum member having at least one magnetic head mounted thereon, a stationary drum member carrying a support shaft on which said rotary drum member is rotatable, said rotary and stationary drum members having outer peripheral surfaces defining a guide surface for a recording tape to be scanned by said head, said stationary drum member having an end face with an aperture therein, and ground contact means having a body portion with a circumferentially resilient peripheral surface which is frictionally engaged against an inner surface of said aperture for connecting said stationary drum member to ground.

2. The rotary head drum apparatus according to claim 1; in which said body portion of the ground contact means is cylindrical and has longitudinal slits.

3. The rotary head drum apparatus according to claim 1; further comprising a printed circuit board disposed against said end face and in which said ground contact means are implanted.

4. The rotary head drum apparatus according to claim 1; wherein said aperture in said end face of said stationary drum member is spaced radially from said support shaft.

* * * * *